United States Patent [19]
Nakada et al.

[11] Patent Number: 6,055,625
[45] Date of Patent: Apr. 25, 2000

[54] PIPELINE COMPUTER WITH A SCOREBOARD CONTROL CIRCUIT TO PREVENT INTERFERENCE BETWEEN REGISTERS

[75] Inventors: Tatsumi Nakada; Toshiharu Ohshima, both of Kawasaki, Japan

[73] Assignee: Fujitsu Limited, Kawasaki, Japan

[21] Appl. No.: 08/889,046

[22] Filed: Jul. 7, 1997

Related U.S. Application Data

[63] Continuation of application No. 08/519,176, Aug. 25, 1995, abandoned, which is a continuation of application No. 08/121,495, Sep. 16, 1991, abandoned.

[30] Foreign Application Priority Data

Feb. 16, 1993 [JP] Japan .................................. 5-026845

[51] Int. Cl.[7] .................................................. G06F 11/00
[52] U.S. Cl. ..................... 712/216; 712/200; 712/217
[58] Field of Search .................................. 395/376, 392, 395/393; 712/200, 216, 217

[56] References Cited

U.S. PATENT DOCUMENTS

| | | | |
|---|---|---|---|
| 4,891,753 | 1/1990 | Budde et al. | 364/200 |
| 4,903,264 | 2/1990 | Talgam et al. | 395/183.01 |
| 4,916,652 | 4/1990 | Schwarz et al. | 364/748 |
| 5,051,940 | 9/1991 | Vassiliadis et al. | 364/736 |
| 5,251,306 | 10/1993 | Tran | 395/375 |
| 5,355,457 | 10/1994 | Shebanow et al. | 395/375 |
| 5,448,705 | 9/1995 | Nguyen et al. | 395/376 |
| 5,450,555 | 9/1995 | Brown, III et al. | 395/375 |
| 5,481,683 | 1/1996 | Karim | 395/376 |
| 5,487,156 | 1/1996 | Popescu et al. | 395/375 |
| 5,625,789 | 4/1997 | Hesson et al. | 395/393 |

FOREIGN PATENT DOCUMENTS

| | | |
|---|---|---|
| 0 487 317 | 5/1992 | European Pat. Off. |
| 63-148331 | 6/1988 | Japan . |
| 2-301829 | 12/1990 | Japan . |
| 5-002482 | 1/1993 | Japan . |

OTHER PUBLICATIONS

Y. Talgam, "Shadow Scoreboard and Implementation," *Motorola Technical Developments*, vol. 8, Oct. 1988, No. 1, Schaumburg, IL, pp. 43–44.

*Patent Abstracts of Japan*, vol. 16, No. 85 (P–1319), Feb. 28, 1992 & JP–A–3 269628 (Fujitsu Ltd) Dec. 2, 1991.

Smith et al.; Implementing Precise Interrupts in Pipelined Processors; May 1988; IEEE Transactions on Computers; vol. 37, No. 5; pp. 562–573.

Talgam; Motorola Technical Developments; vol. 8, No. 1; Oct., 1988.

*Primary Examiner*—Zarni Maung
*Assistant Examiner*—Saleh Najjar
*Attorney, Agent, or Firm*—Staas & Halsey LLP

[57] ABSTRACT

A pipeline computer having functions of scoreboard control includes a dependency detection unit provided in the scoreboard for detecting dependency of data between a preceding instruction and a following instruction, the preceding instruction being an instruction which executes prior to the following instruction; and an ensuring unit for the dependency of data detected by the detection unit based on an interlock operation at pipeline processes when an interruption occurs. An interruption instruction waits for completion of an instruction which already starts to execute prior to the interruption instruction, and all register bits on the scoreboard indicating the in use state are reset to the not used state to ensure the dependency of data.

2 Claims, 17 Drawing Sheets

Fig.16

$$\begin{cases} \text{load} \quad (gr2+gr3) \longrightarrow gr4 \\ \text{add} \quad gr4+gr5 \longrightarrow gr6 \end{cases}$$

```
         D    E    C1   C2   W
LOAD   ├───┼───┼───┼───┼───┤
         1    1    1    0   ←── SCB BIT

D    D    D    D    E    W
ADD         ├───┼───┼───┼───┼───┼───┤
```

Fig.17

$$\begin{cases} \text{load} \quad (gr2+gr3) \longrightarrow gr4 \\ \text{add} \quad gr5+gr6 \longrightarrow gr4 \\ \quad \vdots \\ \text{add} \quad gr4+gr7 \longrightarrow gr8 \end{cases}$$

```
         D    E    C1   C2   W
LOAD   ├───┼───┼───┼───┼───┤
         1    1    1    0   ←── SCB BIT
              D    E    W
ADD         ├───┼───┼───┤

ADD                              ├───┼───┼───┤
```

Fig.18 load (gr2 + gr3) ⟶ gr4

```
         D   E
LOAD   ├---┼---┼-----------------
         1   1
```

Fig.19

$$\begin{cases} \text{load } (gr2 + gr3) \longrightarrow gr4 \\ \text{load } (gr2 + gr3) \longrightarrow gr5 \\ \text{add } \ \ gr6 + gr5 \longrightarrow gr6 \end{cases}$$

```
   D   E   C   W
├---┼---┼---┼---┤
  1   1   0       ◄── SCB BIT

D   E   C   W
     ├---┼---┼---┼---┤
       1   1   0       ◄── SCB BIT

D   D   D   E   C   W
         ├---┼---┼---┼---┼---┼---┤
```

PIPELINE COMPUTER WITH A SCOREBOARD CONTROL CIRCUIT TO PREVENT INTERFERENCE BETWEEN REGISTERS

This application is a continuation of application Ser. No. 08/519,176, filed Aug. 25, 1995, now abandoned, which is a continuation of application Ser. No. 08/121,495, filed Sep. 16, 1991, now abandoned.

BACKGROUND OF THE INVENTION

1. Field of the Invention

The present invention relates to a pipeline computer, and more particularly, relates to a control method for a scoreboard in a pipeline computer.

2. Description of the Related Art

In a pipeline computer, a scoreboard (or SCG) is known as a method for managing and controlling the mutual dependency of operands which are used in a calculation. As one example, the scoreboard is used for an interference detection in the general registers as explained in detail below.

That is, a scoreboard storage unit is provided for indicating an in use state or a not used state of each general register. When executing an instruction which writes data into a general register (i.e., write instruction), a bit in the scoreboard corresponding to the number of the register is set to the set state to indicate that a write operation is being executed. Further, when an instruction writes a result of a calculation into a general register, a bit in the scoreboard corresponding to the number of the register, is set to the reset state to indicate that the write operation has been completed.

In this case, to confirm whether or not the rewriting of the bit has been executed by a preceding instruction by a source operand, an instruction which follows the preceding instruction (hereinafter referred to as the "following instruction") reads the bit corresponding to the register number which indicates the source operand. If the bit is set, that indicates that the rewriting based on the preceding instruction is not completed, and the following instruction waits for the start of a calculation.

If the bit on the scoreboard is reset, since the preceding instruction does not rewrite the source operand, the following instruction can start the calculation.

SUMMARY OF THE INVENTION

The object of the present invention is to provide a pipeline computer enabling correct setting/resetting of a bit in a scoreboard when an interruption occurs during the execution of a preceding instruction, and enabling an improvement of the register interference control without reducing the response characteristics of the interruption.

In accordance with one aspect of the present invention, there is provided a pipeline computer having scoreboard control functions including a dependency detection unit and an ensuring unit.

The dependency detection unit is provided in the scoreboard for detecting the dependency between a preceding instruction and a following instruction, the preceding instruction being an instruction which executes prior to the following instruction.

The ensuring unit is for the dependency detected by the detection unit based on an interlock operation of the pipeline processes when an interruption occurs.

Also in the present invention, an interruption instruction waits for completion of an instruction which has already started to execute prior to the interruption instruction, and all register bits on the scoreboard indicating the in use state are reset to the not used state to ensure the dependency of data.

In accordance with another aspect of the present invention, there is provided a pipeline computer having scoreboard control functions including a dependency detection unit, an ensuring unit, and a scoreboard setting storage unit.

The dependency detection unit is provided in the scoreboard for detecting the dependency between a preceding instruction and a following instruction, the preceding instruction being an instruction which executes prior to the following instruction.

The ensuring unit is for the dependency detected by the detection unit based on an interlock operation of the pipeline processes when an interruption occurs.

The scoreboard setting storage unit is for holding information bits on the scoreboard which are set to the in use state.

In the present invention, when an interruption occurs, an interruption instruction waits for completion of an instruction which has already started to execute prior to the interruption instruction. Further in the present invention, the register bits indicating an in use state in the scoreboard which are set in error are reset to the not used state based on a scoreboard setting address signal from the scoreboard setting storage unit which indicates the location which is set to the in use state, and based on a score board setting invalid signal from the scoreboard setting storage unit which indicates that the scoreboard is set to the in use state in error.

In a first embodiment of the present invention, a pipeline computer further includes a scoreboard resetting address selection unit and a scoreboard resetting enable selecting unit. The scoreboard resetting address selection unit inputs a scoreboard setting address signal, a register writing address indicating a write register number to a register file, and a selector selecting signal and selects a resetting address of the scoreboard.

The scoreboard resetting enable selecting unit inputs a scoreboard setting invalid signal, a register writing enable signal for controlling the write to the register file, and a selector selecting signal and selects the reset enable signal from the scoreboard.

In addition, in the first embodiment, when an interruption occurs, the interruption instruction waits for completion of an instruction which has already begun to execute prior to the interruption instruction, and the selector selecting signal is asserted after waiting for completion of the instruction. Further, the register bits indicating the in use state of the scoreboard which are set in error are reset based on the scoreboard setting address selected by the selector selecting signal, and based on the scoreboard setting invalid signal.

In a second embodiment of the present invention, a pipeline computer further includes an operation block having a write register information holding unit for holding register information which is written by the write instruction.

Also in the second embodiment, when an interruption occurs in the operation block after loss of the bit information of the scoreboard in which the scoreboard set storage unit sets the bit to the in use state, the scoreboard is reset to the not used state by using the information of the write register information holding unit.

In a third embodiment of the present invention, a pipeline computer further includes a scoreboard reset address selecting unit and a scoreboard reset enable unit. The scoreboard reset address selecting unit receives the scoreboard setting address signal, the register writing address, and the selector selecting signal and selects a reset address of the scoreboard.

The scoreboard reset enable selecting unit receives the scoreboard setting invalid signal, the register write enable for controlling write to the register file, and the selector selecting signal and selects a reset enable signal of the scoreboard.

In the third embodiment, when an interruption occurs, the interruption instruction waits for completion of an instruction which has already begun to execute prior to the interruption instruction, and the selector selecting signal is asserted after waiting, the register bits indicating the in use state in the scoreboard which are set in error are reset based on a scoreboard set address selected by the selector selecting signal, and on a scoreboard set invalid signal.

In accordance with a second aspect of the present invention, there is provided a pipeline computer having scoreboard control functions. The pipeline computer includes a unit for performing a non-serialized process.

In the unit for performing a non-serialized process, when an instruction has already started to execute prior to the interruption instruction, the interruption instruction starts to execute without waiting for completion of the preceding instruction.

In the second aspect, when an interruption is detected, an interruption instruction waits for completion of all instructions except for non-serialized instructions which start to execute prior to the preceding instruction; all register bits indicating the in use state in the scoreboard are reset to the not used state; and after the register bits are reset to the not used state, all bits of the scoreboard corresponding to the registers in which the non-serialized instructions execute write operations are set to the in use state.

In a fourth embodiment of the present invention, a pipeline computer further includes a scoreboard setting information unit and a scoreboard unit. The scoreboard setting information selecting unit selects a set signal and a reset signal for the scoreboard. The scoreboard unit sets the scoreboard by the output of the scoreboard set information selection unit.

In the fourth embodiment, after the register bits indicating the in use in the scoreboard are reset to the not used state, the register bits corresponding to the registers in which the non-serialized instruction executes the write operation are set to the in use state; the scoreboard resetting information is sent using the same signal line as a signal line for resetting the scoreboard to the not used state when the non-serialized instruction is completed; and the scoreboard setting information selecting unit selects the signal for resetting, and executes resetting of the scoreboard based on the scoreboard resetting information.

BRIEF DESCRIPTION OF THE DRAWINGS

In the drawings:

FIG. 16 is an explanatory view for preceding/following instructions;

FIG. 17 is an explanatory view for preceding/following instructions when the following instruction does not wait for completion of the preceding instruction;

FIG. 18 is an explanatory view of an erroneous scoreboard caused by an interruption; and FIG. 19 is an explanatory view of a pipeline computer not using an asynchronous execution.

DESCRIPTION OF THE PREFERRED EMBODIMENTS

Figure 1:
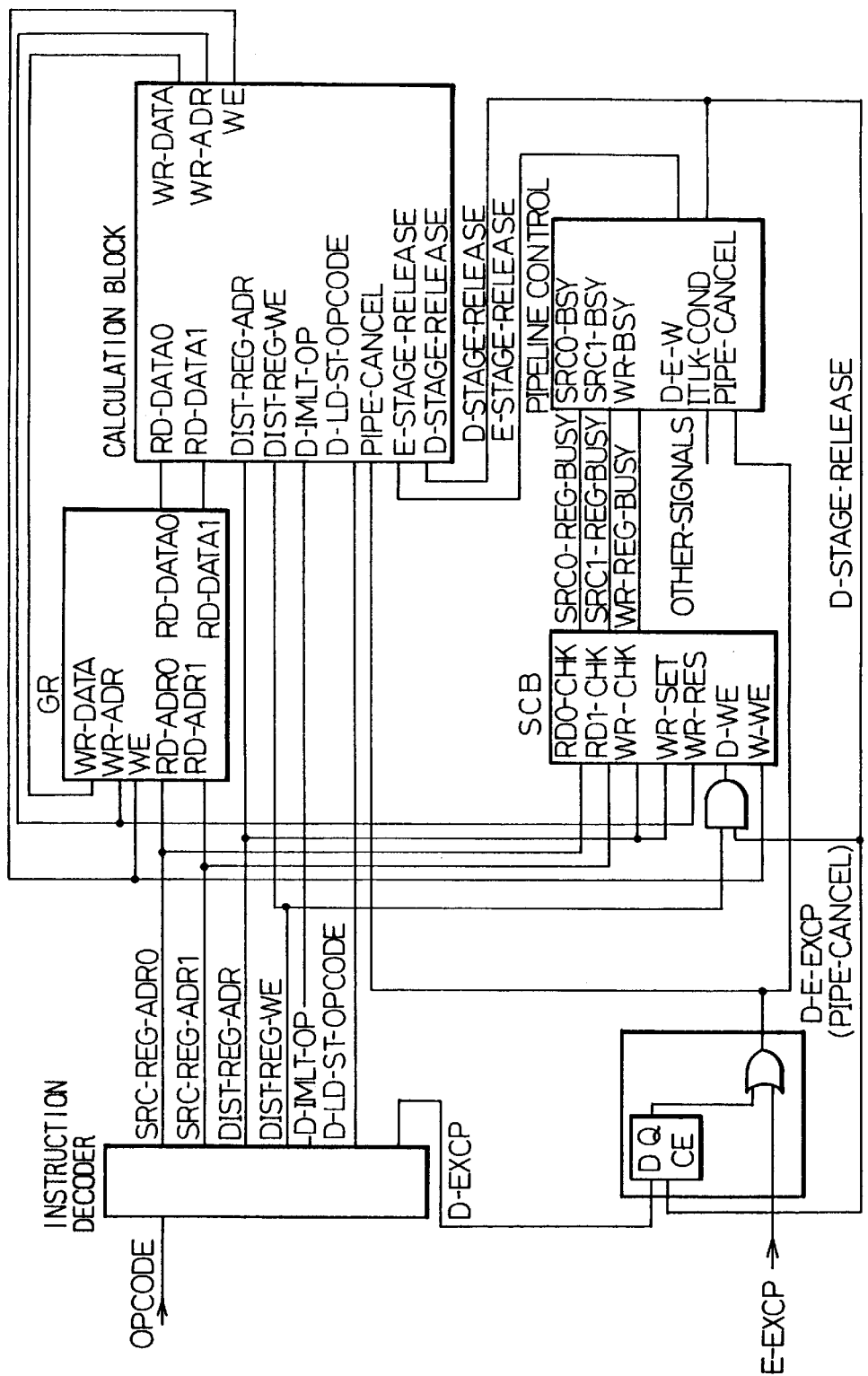
FIG. 1 is an essential structural view of a pipeline computer using a scoreboard of the present invention.

FIG. 16 is an explanatory view of preceding/following instructions. This is the case in which the following instruction waits for the completion of the preceding instruction. According to this example, the following instruction can read correct data.

To confirm whether the rewriting of the bit is executed by the instruction which a write operand executes precedingly, the following instruction reads the bit corresponding to the register number indicating the read operand. If the bit is set, which shows that the rewriting is not completed by the preceding instruction, the following instruction waits to start the calculation. If the bit on the scoreboard is reset, since the instruction which executes precedingly does not rewrite the write operand, the following instruction can start the execution of the calculation.

FIG. 17 is an explanatory view of another example of the preceding/following instruction. This is the case in which the following instruction does not wait for the completion of the preceding instruction. FIG. 17 shows that, if the following instruction does not wait for completion of the writing, the order of writing may not be ensured and the mutual relationship between data may not be processed correctly. In this example, although the third ADD instruction expects to read the result of the second ADD instruction, the result of the LOAD instruction written into the same register is read after completion of the write by the second ADD instruction. This process results in an error.

The setting of the bit in the scoreboard indicates that a value of the register cannot be read (or, cannot be written). In the case of almost all basic instructions, (for example, an adding instruction) the E-stage is completed during one cycle (1τ), and the following instruction can read the result of the E-stage as the source operand based on a bypass function.

Further, an instruction in which the E-stage is completed within 1τ has no possibility of an erroneous operation because the following instruction passes the preceding instruction, as shown in FIG. 17. Accordingly, for the basic instruction, such as the adding instruction (i.e., the instruction having the shortest execution time, such that it can be executed during one cycle and the E-stage is executed during 1τ), the mutual interference of data can be avoided without setting/resetting of the scoreboard. This is the reason that the values of the scoreboard are not changed in the adding instructions in FIGS. 16 and 17.

The process of the scoreboard when an interruption occurs is explained in detail below. FIG. 17 shows an example of the case in which, during execution of the ADD instruction, an overflow interruption is generated at the E-stage during execution of the LOAD instruction. Since this interruption is executed after the result is written into the register (i.e., after completion of the instruction), the preceding LOAD instruction is completed and the execution result must be ensured.

For example, there are two methods to accomplish the foregoing, i.e., (1) an interruption program is executed after completion of the LOAD instruction, (2) the interruption program is executed without waiting for completion of the LOAD instruction. When accessing (reading/writing) the register which is rewritten by the LOAD instruction, the register is accessed by the method using the scoreboard after completion of the LOAD instruction. However, there are problems in above two methods (1) and (2) in that correct operations cannot be ensured as explained in detail below.

FIG. 18 shows the case in which the scoreboard becomes incorrect due to the interruption. In FIG. 18, a memory address of the LOAD instruction generates an address alignment exception (this indicates that, for example, although the read data is formed of four bytes, the address cannot be divided by four bytes, i.e., the address is not formed from an integer times the data size). As explained above, since the scoreboard is set at the front half of the E-stage, the scoreboard is set, although the instruction is canceled due to the interruption. In this state, when the gr4 is accessed, the access enter the state which waits for the write into the register so that the system enters a hang-up state. That is, a contradiction occurs in the scoreboard due to the interruption so that it is impossible to correctly control register interferences.

The object of the present invention lies in a pipeline computer in which a scoreboard can set correctly even if an interruption occurs so that it is possible to realize normal register interference, and in which the response characteristics of the interruption is not reduced when a lot of time is required for the write into the register.

The present invention is explained in detail hereinafter.

In the first solution method of the present invention, all bits on the scoreboard are reset when the interruption occurs, the scoreboard which is set in error is reset, and the execution of next instruction (i.e., execution of the interruption program) is started after all instructions of which the execution is started prior to the interruption are completed.

In a second solution method of the present invention, all register numbers which set the scoreboard in error are held, the scoreboard which is set in error when the interruption occurs is reset, and the execution of next instruction (interruption program) is started after all instructions in which the execution is started prior to the interruption are completed.

In this case, the following is the reason for waiting for completion of all instruction which the execution is started prior to the interruption. That is, even if a privilege/user mode of the processor is changed in the interruption, although it is necessary that the operation is the same as that of an original mode, for example, the result of the instruction issued by the user mode must be written into the register of the user mode. However, if it is the case which does not wait for completion of all instructions which the execution is started prior to the interruption, the control for the above process becomes complicated.

New problems and guides for solution therefore will be explained in detail below.

The processes of the scoreboard when the interruption occurs, as explained in the first solution, are to wait for completion of all instructions which execute the write operation, and then to reset all bits of the scoreboard so that it is possible to perform the control without contradiction. Only the process is to wait for completion of all instructions, the scoreboard is kept to "set" based on the instruction which is canceled by the interruption or the instruction in which the write is inhibited by the interruption. Accordingly, all bits of the scoreboard are reset.

Further, if the process is to wait for completion of all instructions which perform the write operation when the interruption occurs, the response characteristics of the interruption become worse in the following cases. That is, this is the case of the structure connecting a co-processor which executes a vector process. When the instructions are filled in an instruction queue of the co-processor, and when an instruction for rewriting the general register is filled in the end queue, it is possible to start the interruption after execution of several instructions of the vector processes which necessitate a lot of execution time. For example, if a length of the vector is 500, and if five instructions are stored in the queue, the interruption process is started after about 2500τ.

As explained above, since the response characteristics of the interruption become worse in the co-processor which executes the vector process, it is necessary to execute the interruption without waiting for the write operation to the register.

However, to ensure the mutual dependency for data, it is necessary to access the register after completion of the instruction by the co-processor when the register which is rewritten by the co-processor instruction is accessed (read/ written). Accordingly, it is necessary that the register which is rewritten by the co-processor is not used in the interruption (and not used in a save) to realize the high speed interruption.

A third solution of the present invention is presented hereinbelow. In the second solution explained above, the control is performed so as to ensure the normality of the scoreboard without a reset operation of all scoreboards when the interruption occurs. That is, the number of the register which sets the erroneous scoreboard, the scoreboard which is set in error when the interruption occurs is reset, and the execution of next instruction (interruption program) is started after completion of all instructions except for the instruction to the co-processor which starts prior to the interruption. Accordingly, there is no new problem in the second solution, such as a lot of waiting time for the vector instruction is required. On the contrary, in the first solution, although it is necessary to take countermeasures against a lot of waiting time for the vector instruction, this can be solved by a marker.

The preferred embodiments of the present invention are explained in detail below along with the operation of each stage.

(Instruction Decode Stage)

First, an instruction is decoded to confirm that the instruction necessitates update of the scoreboard, except for reading from the register. Further, the cause of the interruption is detected by decoding the instruction. The result of decode, i.e., the cause of the interruption is held in a pipeline-tag to use in the following stage.

Next, the bits in the scoreboard corresponding to the write register number are detected. If the bits are set on the scoreboard, the instructions are interlocked in a decode stage. Further, the bits on the scoreboard corresponding to the read register number are detected.

(Calculation Stage)

First, an instruction, which executes the calculation stage, indicates the instruction which necessitates the update of the scoreboard except for execution of the calculation, the bits corresponding to the write register number are set. The cause of the interruption is detected from the result of the calculation.

When there are any interruption causes, the start of the interruption of a hardware is instructed to the interruption control circuit. In the case of the interruption which must stop the execution, for example, the interruption of a privilege instruction offence, the control is performed as the register write signal is inhibited, and as the value of the register is not changed.

(Write Stage)

Except for the write process which writes the result of the calculation stage into the register, when the instruction which executes the write stage indicates the instruction which necessitates the update of the scoreboard, the bits on the scoreboard corresponding to the write register number are reset.

Figure 6:
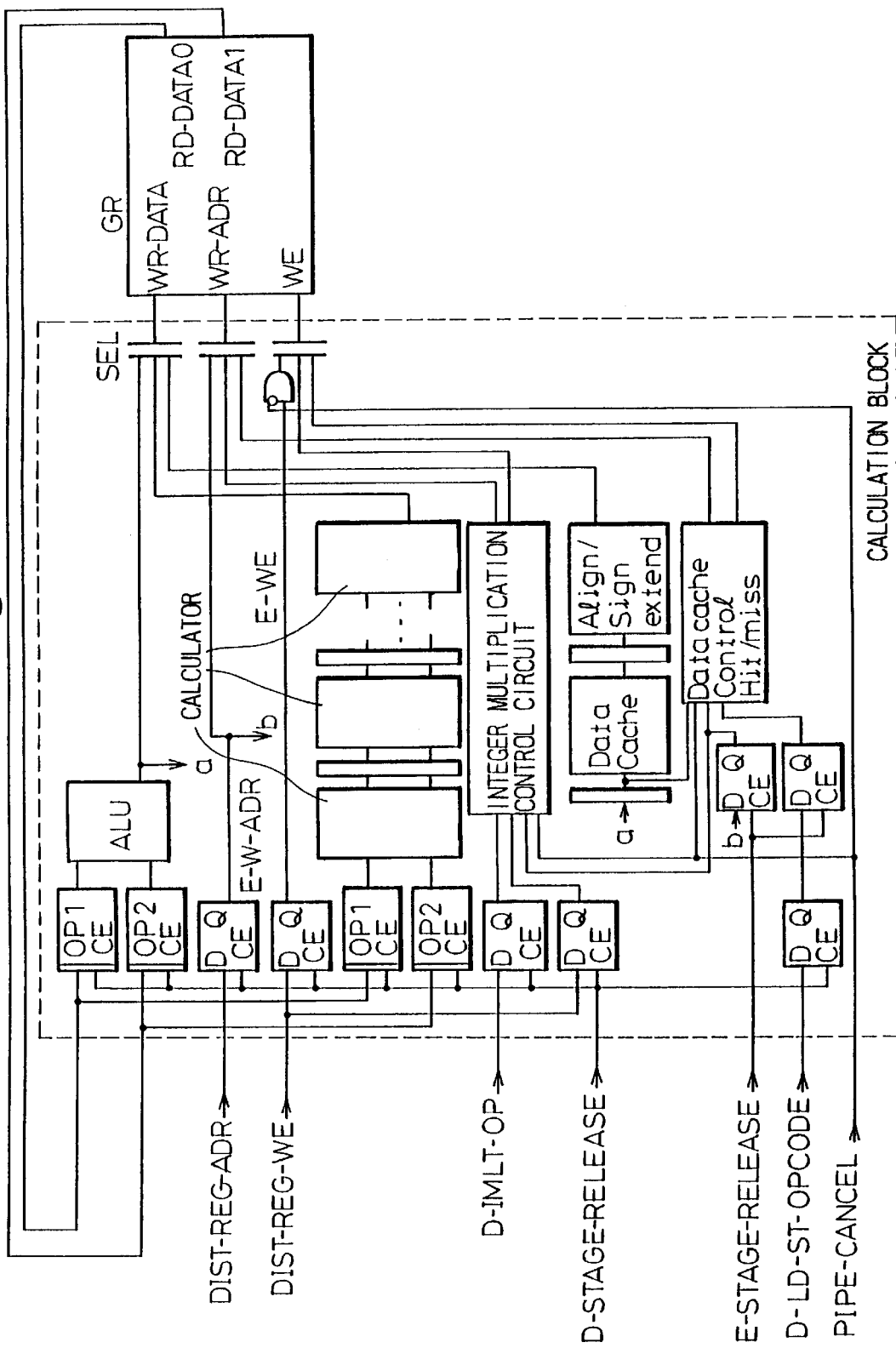
FIG. 6 shows one example of a calculation bock and a register file according to the present invention.

The operation of the data processing apparatus is explained hereinbelow. FIG. 6 is a block diagram of a register file and a calculation block. The block includes an ALU which executes arithmetic calculation and a logical calculation; an integer-multiplier; a memory access unit, and a data cache block for a load-store instruction. This block executes the read of the source operand of the calculation, and the write of the result of the calculation. In this case, although clocks are not input in a part of the registers to simplify the drawing, in actuality, the clocks are input to all registers, and this block is formed of the complete synchronous circuit based on clocks.

When executing the instruction which is calculated in the ALU, the result is obtained in one calculation stage. The selection circuit before the register file selects the output of the ALU (see the upper most signal in FIG. 6), the result of the ALU is written into the register file in accordance with a write register address and a write control signal which are held in the pipeline resister E-W-ADR and E-W-E.

When executing an integer multiplication instruction, the result is obtained in a plurality of calculation stages. Accordingly, the write operation to the register file is controlled by the integer multiplication after completion of the calculation. A selection circuit selects the output of the integer multiplication circuit and the integer multiplication control circuit, and the result of the integer multiplication is written into the register file in accordance with the write register address and the write control signal which are generated in the integer multiplication control circuit.

When executing a memory access instruction, it is necessary to execute a data transfer from an external main memory when a cache miss occurs in the cache in the execution of a load instruction. Accordingly, the write operation to the register file is controlled when a hit to the cache is confirmed, or when the data transfer from the external main memory is completed. The selection circuit selects the output of the cache block (see, the lower most signal in the drawing), and the result of the load instruction is written into the register file in accordance with the write register address and the write control signal which are generated in the cache control circuit.

When the instruction which is calculated in the ALU executes in the E-stage, and an interruption having a inhibition type is detected, the signal PIPE-CANCEL is asserted and the write operation is inhibited. In this case, since the instruction which executes prior to the interruption is not inhibited, the preceding instruction is not dependent on the signal PIPE-CANCEL. When executing an integer multiplication instruction and the memory access instruction, and a interruption having inhibition type is detected, the signal PIPE-CANCEL is asserted and the write operation is inhibited in each control circuit.

The operation of the scoreboard is explained for the pipeline processing apparatus (data processing apparatus) shown in FIG. 1.

The scoreboard is read in accordance with the result of the decode of the instruction so that an operand register number (SRC-REG-ADR0, SRC-REG-ADR1) and a write operand register number (DIST-REG-ADR) can be obtained. The signals SRC-REG-ADR0 and SRC-REG-ADR1 are input to the read register address of the resister file GR to read the source operand.

The source operand which is read from the general register is held in the operand register OP1 and OP2 (see FIG. 6). The output of the operand register is input to the calculator ALU to execute the calculation. The result of the calculation, the write register number, and the write control number (DIST-REG-WE) are controlled in accordance with the kind of the calculation including LOAD instruction, and the result of the calculation are written into the general resister GR.

When there is no mutual interference of the data, the above operations are executed. When there is the mutual interference, the operations are as follows.

Figure 2:
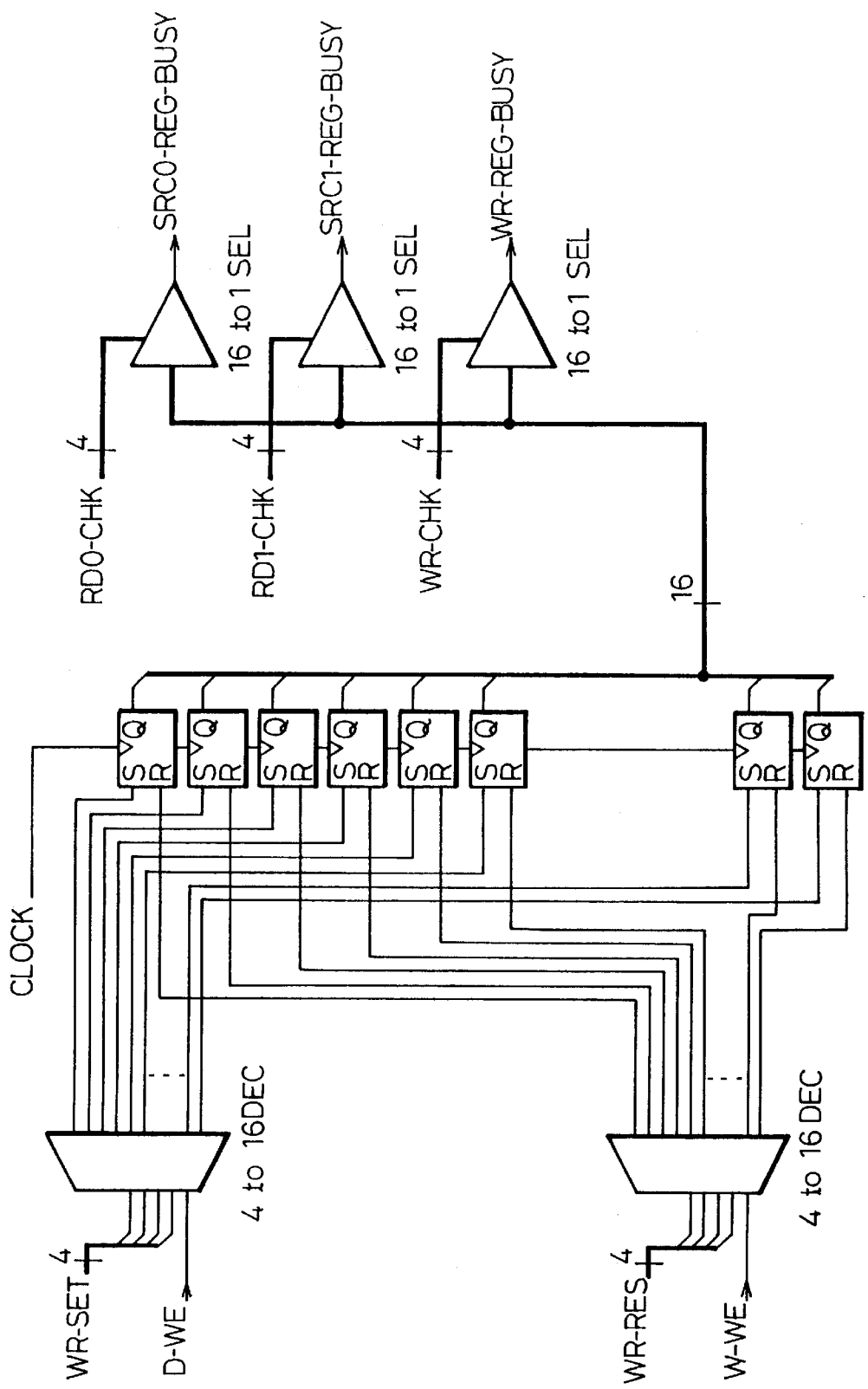
FIG. 2 shows one example of a scoreboard according to the present invention.
Figure 3:
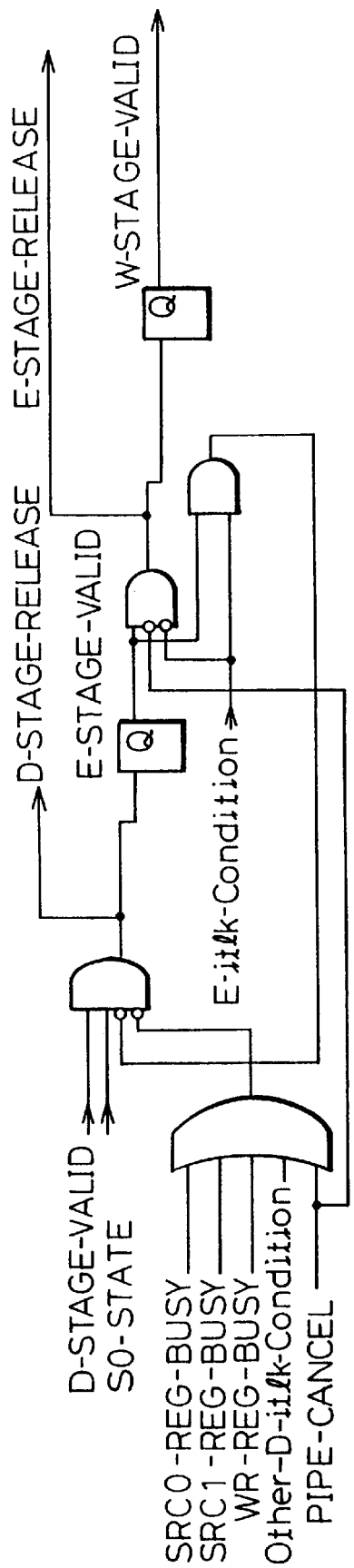
FIG. 3 is a block diagram of a pipeline control circuit according to the present invention.

FIG. 2 is a structural view of the scoreboard according to an embodiment of the present invention. FIG. 3 is one example of a pipeline control circuit. The read operand register number (SRC-REG-ADR0, SRC-REG-ADR1), the write operand register number (DIST-REG-ADR) are input to the write register detection ports (RD0-CHK, RD1-CHK, and WR-CHK). The above detection ports (RD0-CHK, RD1-CHK, and WR-CHK) are used as selection signals which select the registers indicating the in use or the not used state within the scoreboard. The selected signals (SRC0-REG-BUSY, SCR1-REG-BUSY, and WRITE-REG-BUSY) are input to the pipeline control circuit (see FIG. 3), and used for determining whether the decode stage is interlocked.

If any one of signals (SRC0-REG-BUSY, SCR1-REG-BUSY and WRITE-REG-BUSY) indicate an in use state, the signal D-STAGE-RELEASE is inhibited. The signal D-STAGE-RELEASE is the control signal indicating completion of the decode stage and progress to the execution stage. Accordingly, if any one of signals (SRC0-REG-BUSY, SRC1-REG-BUSY and WRITE-REG-BUSY) indicate an in use state, these signals are interlocked in the decode stage, and the process waits for the release of the register which is used next.

When interlocking in the above state, the scoreboard register indicating an in use or a not used state is reset (indicates "not used") when the preceding instruction is completed. When the register number coincides with the register number which intends to use next, the signals (SRC0-REG-BUSY, SRC1-REG-BUSY and WRITE-REG-BUSY) are negated, and the inhibition of the signal D-STAGE-RELEASE is released and shifted to the execution stage.

As explained above, the source operand waits for the rewriting by the preceding instruction, and it is possible to realize the read of the most recent data. Further, an order of the write is ensured by executing after completion of the write by the preceding instruction.

The setting to the scoreboard is executed to the bit of the scoreboard which is indicated by the write operand register number DIST-REG-ADR when the mutual interference is solved (the signal D-STAGE-RELEASE is asserted).

The resetting of the scoreboard is executed to the bit of the scoreboard of the same register in the same timing as the write control of the general register GR of the calculation block.

The operation when the interruption occurs in the first method of the present invention is explained herein below. In the first method, all scoreboards are reset when the interruption occurs so that it is possible to clear the scoreboard which is set in error. Further, the next execution for the instruction (interruption program) is started after completion of all instructions in which the execution is started prior to the interruption.

Figure 4:
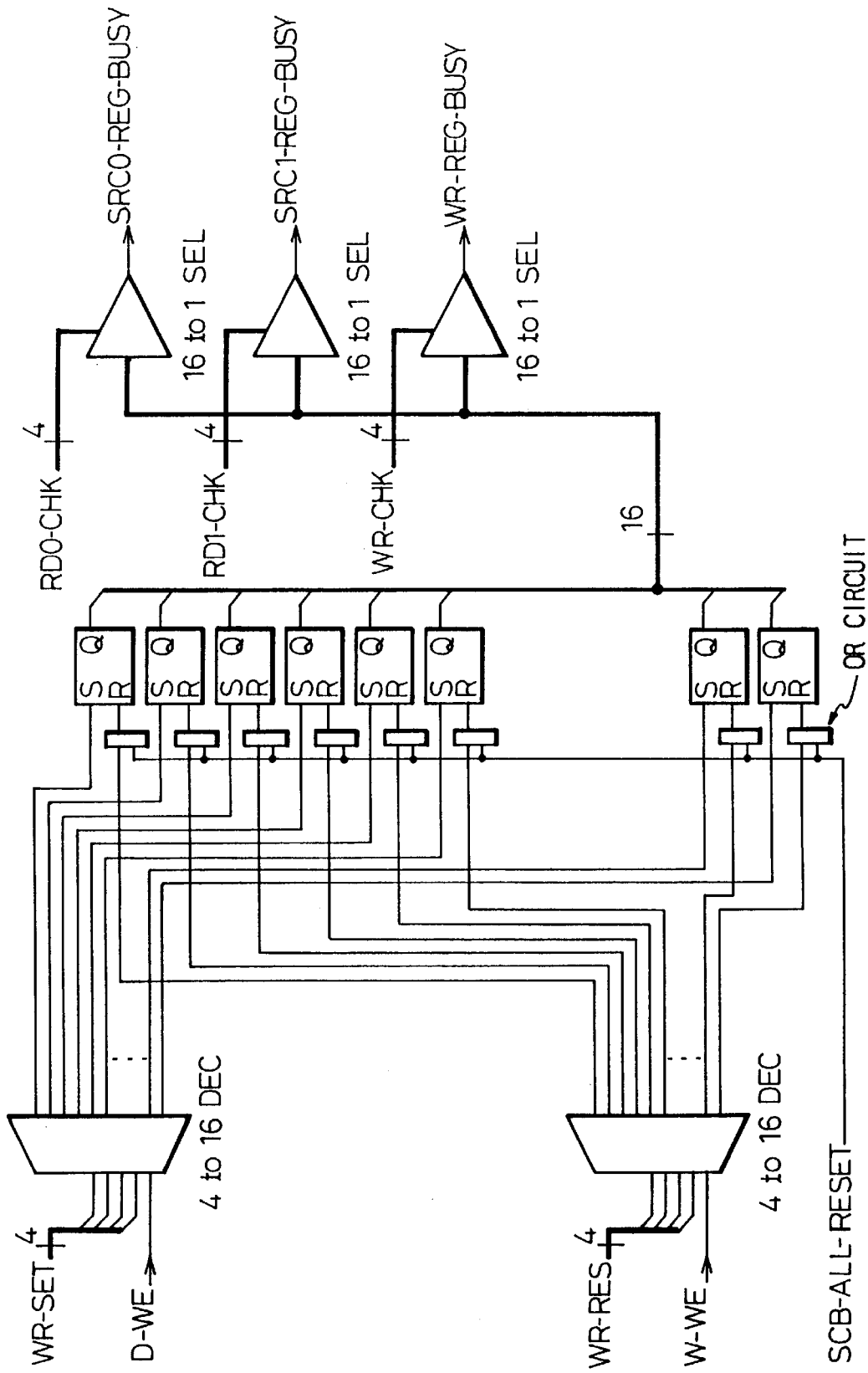
FIG. 4 is a block diagram of a scoreboard having all bits resetting function according to the present invention.

FIG. 4 is a block diagram of the scoreboard having an all reset function according to the present invention. This embodiment shows the scoreboard circuit enabling resetting of all bits of the scoreboard. Since the signals SCB-RESET-ALL are processed by an OR operation regarding the reset inputs of all scoreboards, when the signals SCB-RESET ALL "1", all bits of the scoreboard are reset.

The schematic block diagram of the interruption detection circuit is shown in FIG. 1. In this circuit, the detection of a non-definition instruction is executed by an instruction decoder, the timing of the execution is matched by the register, the cause of the interruption is detected by the OR operation with the cause of the interruption which is detected in the E-stage. In this example, since all interruptions inhibit the instruction, the interruption detection signal is used as an inhibition signal PIPE-CANCEL which inhibits a write control signal of the register. When the calculation enters an overflow/underflow state, the write operation to the register is not inhibited since the instruction is a completion type.

Figure 5:
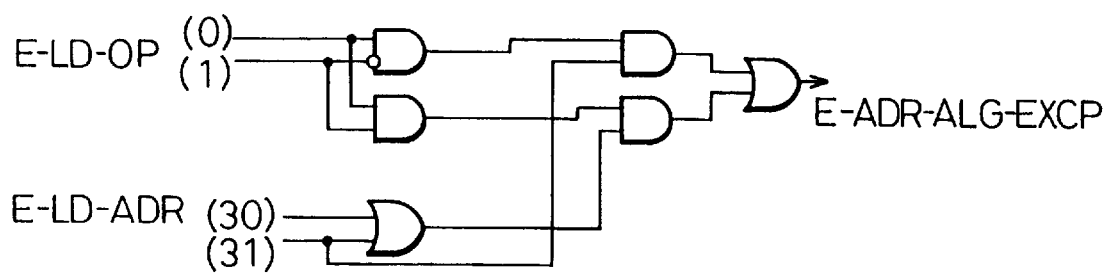
FIG. 5 shows one example of an address alignment exception detection circuit according to the present invention.

FIG. 5 is one example of an address alignment exception detection circuit. The detection of the non-definition instruction is formed of an OR circuit which executes OR operation regarding patterns of all non-definition codes. One example of the cause of the interruption which is detected in the E-stage is a detection circuit of the address alignment exception for the memory access instruction.

Figure 7:
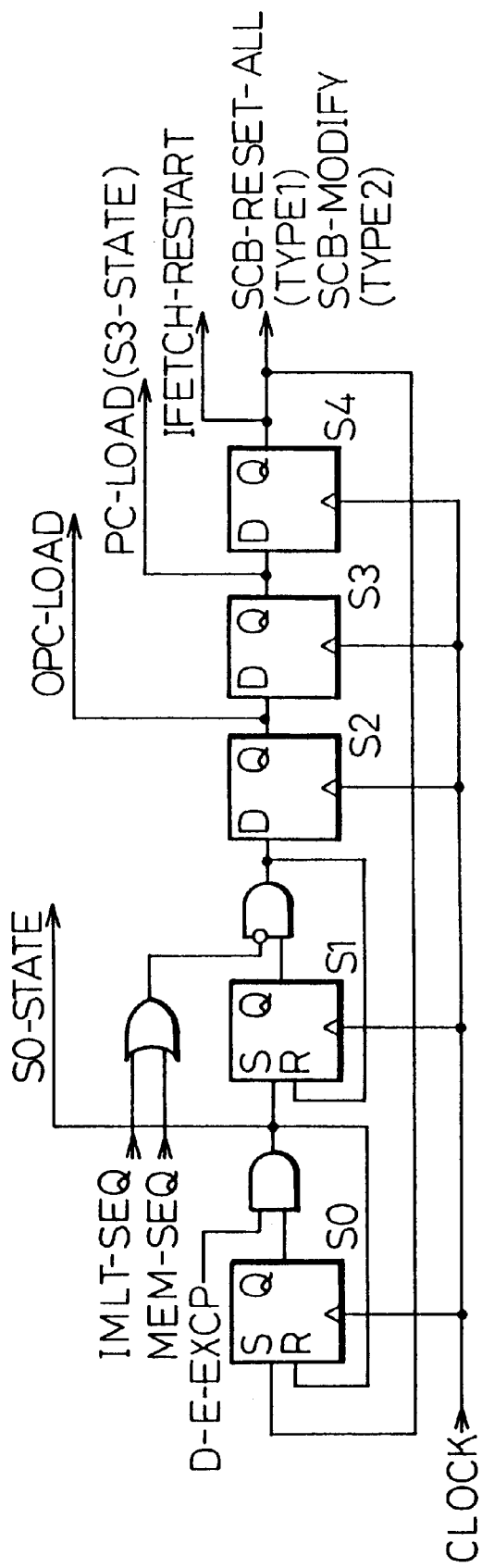
FIG. 7 shows one example of a state transient circuit according to the present invention.

FIG. 7 is one example of a state transient circuit which waits for completion of all instructions of which execution is started prior to the interruption when the interruption occurs.

In an initial state, the register having the state S0 is set to "1", and others are set to "0". This is called the state S0 (S0-STATE). When the interruption occurs, the signal D-E-EXCP becomes "1", the register is shifted from state S0 to S1. As shown in FIG. 3, the signal D-STAGE-RELEASE is not asserted except for state S0, and the execution of the instruction is inhibited.

In state S1, both signals IMLT-SEQ indicating execution of the multiplication instruction and the signal NEW-SEQ indicating execution of the instruction of the memory/cache operation, for example, LOAD/STORE instruction, are input to the OR circuit. State S1 is held until these signals indicate completion of execution, and the register is shifted to state S2 after completion.

In state S2, the value in a program counter PC is transferred to an interruption save register OPC to allow the instruction which is interrupted to be retracted. In the state S3, the address of the destination of the interruption is transferred to the program counter, and the restart of the fetch instruction is instructed in state S4. The register is shifted to state S0 after state S4 is completed, and the execution of the interruption program is started when the instruction fetch circuit completes the fetch of the instruction.

All bits on the scoreboard can be reset at any time except for the state S0. In this example, the signal SCB-RESET-ALL is set to "1" in state S4, and all bits of the scoreboard are reset.

The operation when the interruption occurs in the second method of the present invention is described herein below. In the second method, the scoreboard which is set in error when the interruption occurs is reset, and the execution of the next instruction of the interruption program is started after completion of all instructions which started execution prior to the interruption.

Figure 8:
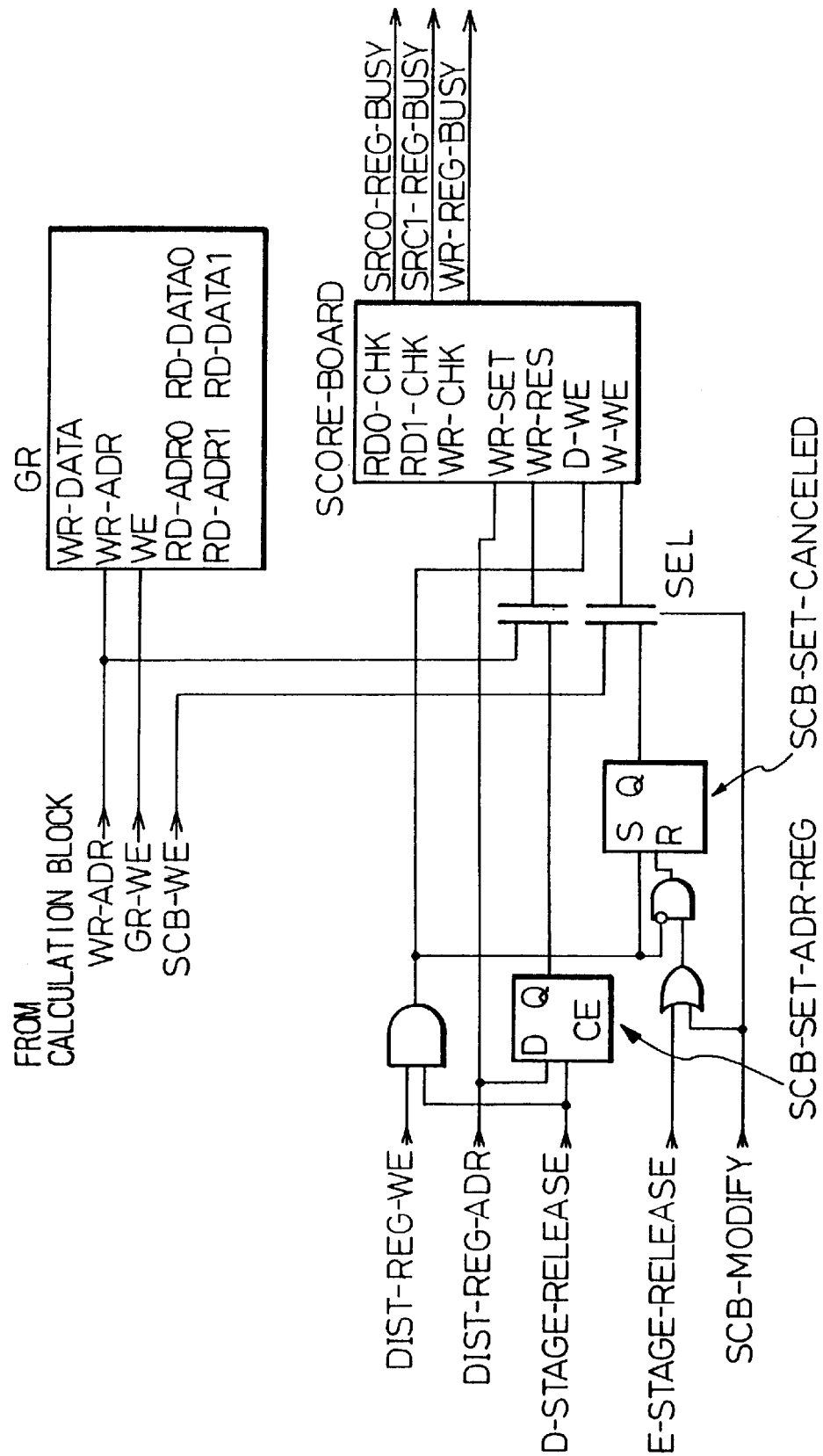
FIG. 8 shows one example of a scoreboard correction circuit according to the present invention.

FIG. 8 is one example of a scoreboard correction circuit. This circuit includes a register to hold the locations of the scoreboard which are set in error, and a selector circuit before the scoreboard resetting port. Further, this circuit includes a register SCB-SET-ADR-REG to hold the register number which is set in error, and a register SCB-SET-CANCELED to hold erroneous bits which are set in error due to canceling of the instruction.

These registers hold the set address and the scoreboard setting signal D-WE in the same timing as the scoreboard setting. If there is no interruption having the inhibition type, the signal D-STAGE-RELEASE is asserted based on the pipeline control circuit. That is, it is clarified that the scoreboard is not set in error. Accordingly, the signal SCB-SET-CANCELED is reset by the signal E-STAGE-RELEASE.

In the pipeline computer, although the setting and resetting operation occur simultaneously, the setting operation is set preferentially. When an interruption of the inhibition type occurs, the signal E-STAGE-RELEASE is negated. Accordingly, since the signal SCB-SET-CANCELED is not reset, it is possible to recognize that the scoreboard which is set in the last stage is in error. When the interruption of the completion type occurs, even if the scoreboard is set, the scoreboard is set correctly since it is completed by rewriting the general register.

As explained above, it is possible to solve the problem in the case that the instruction which sets the scoreboard is canceled in the E-stage. However, in the LOAD/STORE instruction, the following cases may occur that the interruption occurs after execution in the E-stage, and the instruction is canceled. This is explained with reference to FIG. 16. The operand address is calculated in the E-stage, and the cache, the cache tag and the TLB are searched in the C1 stage. Further, the TLB may be checked and a "page invalid exception" may be detected in the C2 stage.

In this case, since the signal SCB-SET-CANCELED is reset by the signal E-STAGE-RELEASE, it is impossible to reset the scoreboard by using the signal SCB-SET- CANCELED. The scoreboard is reset based on the register write information in which the cache block holds. The cache block holds the register write information so as to be able to execute the following instruction by the LOAD instruction.

Figure 9:
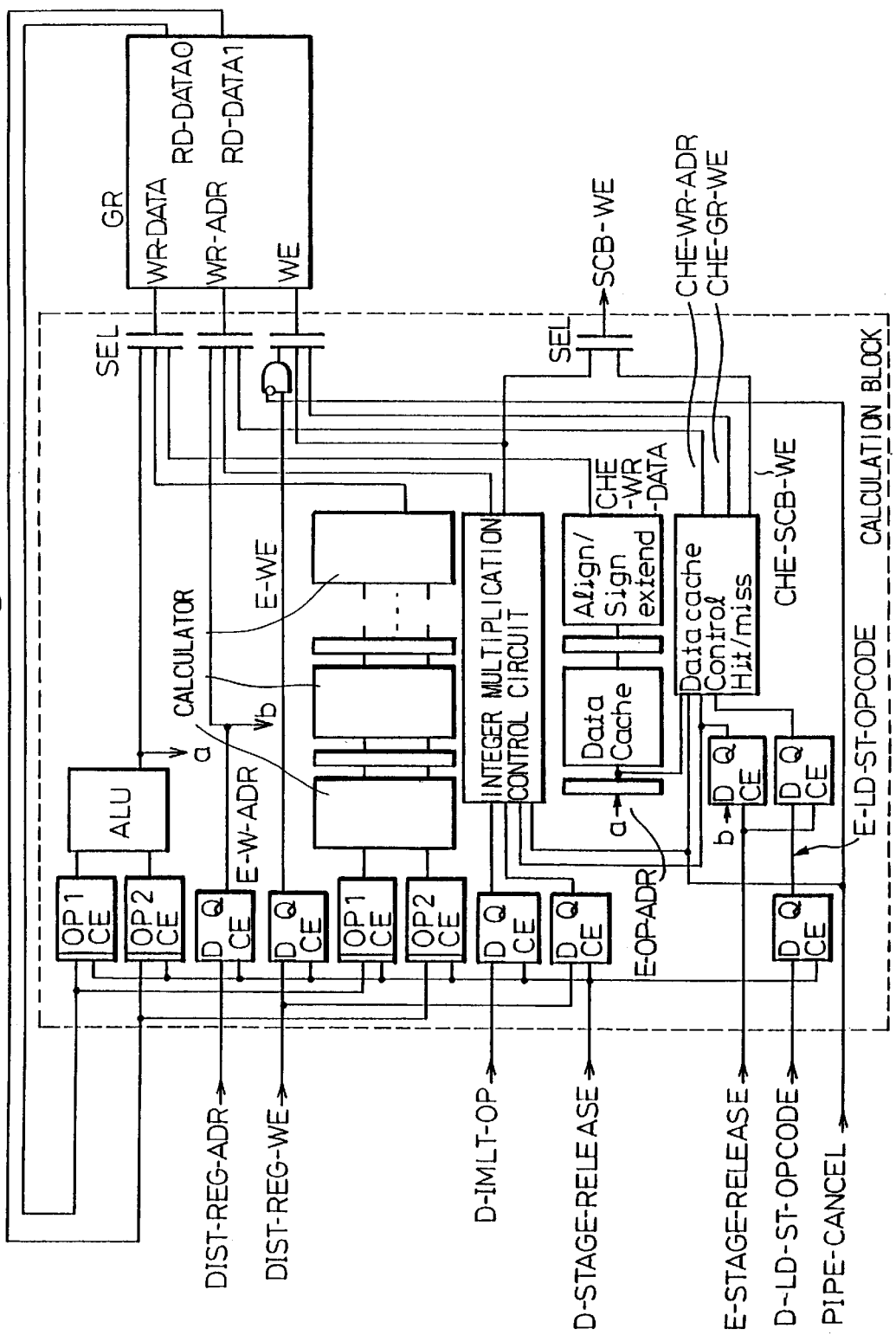
FIG. 9 shows another example of a calculation block and a register file according to the present invention.
Figure 10:
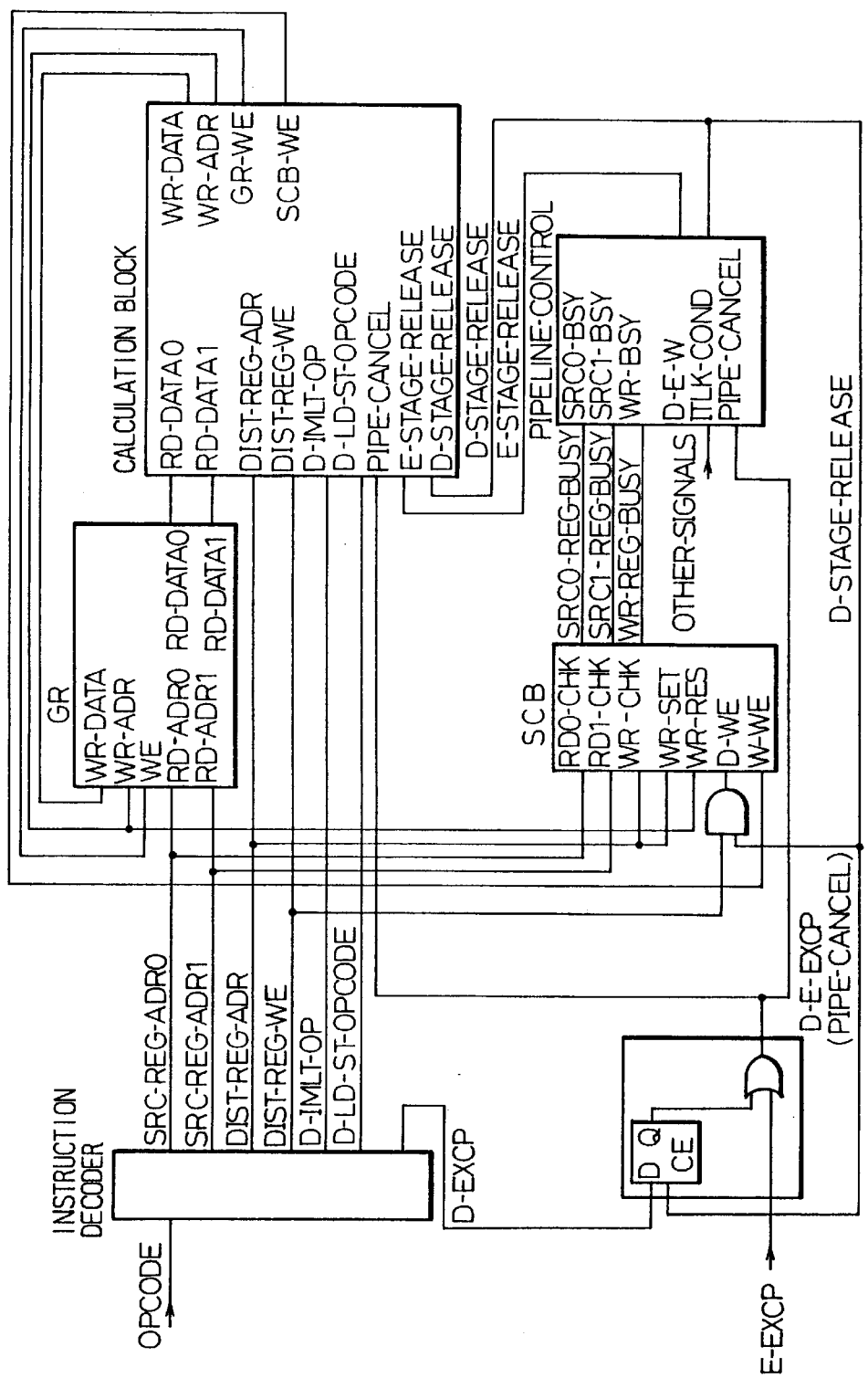
FIG. 10 is an essential structural view of a pipeline computer using a scoreboard of another aspect of the present invention.

FIG. 9 shows another example of the calculation block and register file, and FIG. 10 shows an essential structural view of the pipeline processing apparatus. When the interruption does not occur, the rewriting of the general register and the reset of the scoreboard are simultaneously executed in accordance with the register write information.

When the interruption occurs, only the reset of the scoreboard is executed in accordance with the register write information. Accordingly, although the write control signal to the general register is the same signal as the reset signal to the scoreboard in the conventional art, these signals necessitate separately in the present invention. FIG. 9 shows a signal SCB-WE, and FIG. 10 shows that the signal SCB-WE controls the reset of the scoreboard. The signal SCB-WE is generated by a cache block, and one example of the cache block is shown in FIG. 11.

In FIG. 9, the selector which is provided before the signal SCB-WE executes the same operation as explained previously. In this case, when the selector selects the ALU, this selector can output any value. This is because, since the instruction using the ALU does not set the scoreboard, there is no problem in the fact that the value "0" is output and the reset is not performed. In this example, when the integer calculator is selected, the same signal as the write signal of the general register is output. This is because the circuit is designed as the interruption after the E-stage, such as load instruction, is not contained in this example.

Figure 11:
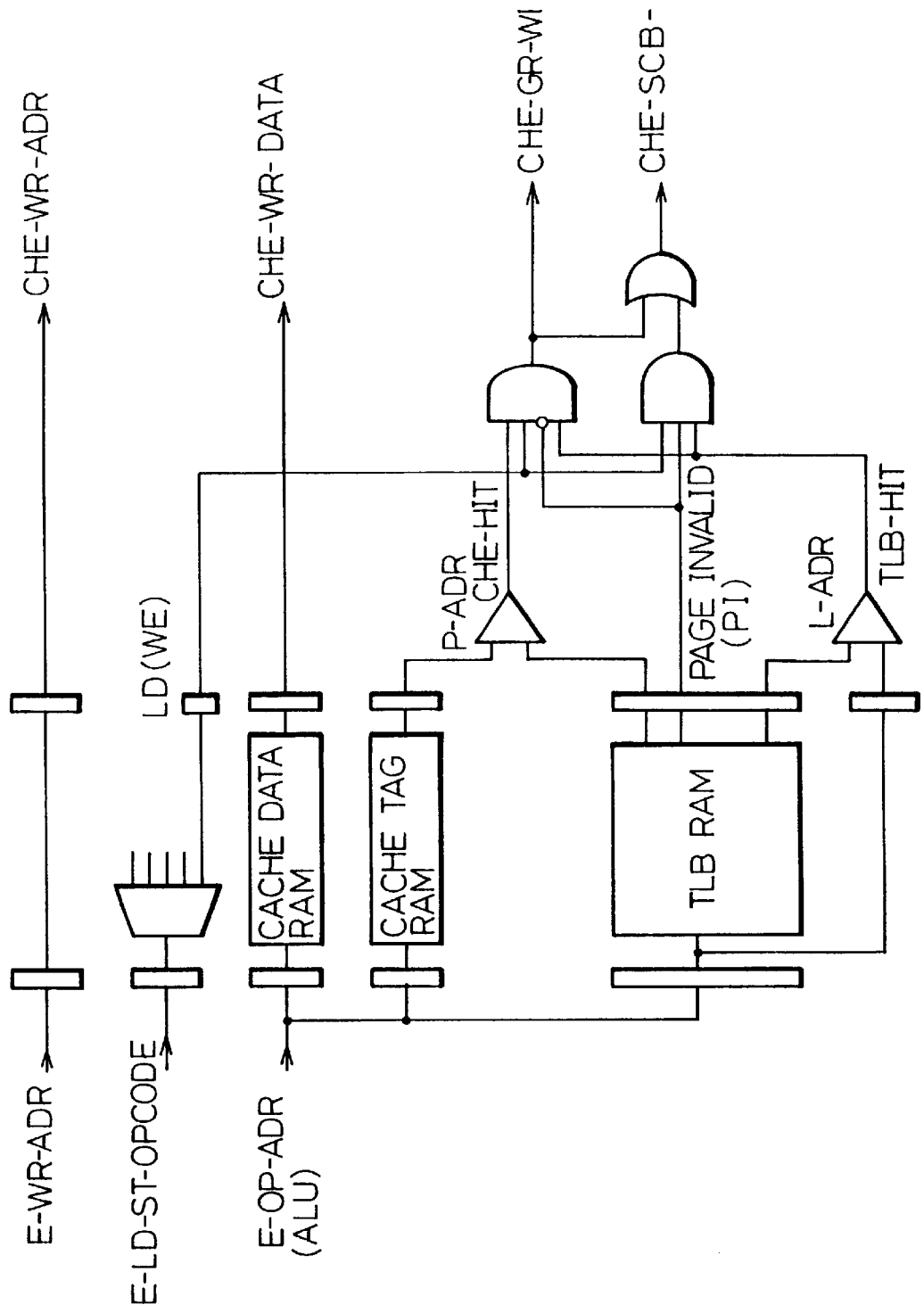
FIG. 11 shows one example of a cache block according to the present invention.

FIG. 11 shows one example of a cache block. When a signal TLB-HIT is set to "1" (i.e., a logical address registered in a TLB coincides with a signal E-OP-ADR), when a page invalid signal CHE-HIT is set to "1" (i.e., a physical address registered in the CHE-TAG coincide with the physical address registered in the TLB), when a page invalid (PI) bit of the TLB is set to "0" (i.e., this indicates that a page does not exist in an actual memory), and when the instruction is the LOAD instruction, the LOAD instruction is hitted to the cache and the data is written from the cache to the general register GR. In this case, the signal CHE-GR-WE is set to "1" and the signal CHE-SCB-WE is also set to "1", further, the reset of the scoreboard is executed with the write of data to the general register.

When the signal TLB-HIT is set to "1" (i.e., the logical address registered in the TLB coincides with the signal E-OP-ADR), when the PI bit of the TLB is set to "1" (i.e., this indicates that the page does not exist in the actual memory), and when the instruction is the LOAD instruction, an exception of absence of the page occurs. In this case, since the LOAD instruction must be inhibited, the signal CHE-GR-WE is set to "1" in order not to write data from the cache to the general register GR. However, the signal CHE-SCB-WE is set to "1" in order to release the scoreboard when the register is in use.

FIG. 7 shows one example of a state transition circuit. This circuit waits for completion of all instructions in which the execution is started prior to the interruption when the interruption occurs (i.e., the same as the first solution).

In the initial state, only the register of the state S0 is "1" and the others are "0". This is called the S0 state. When the interruption occurs, the signal D-E-EXCP become "1" and the state is changed from the S0 to S1.

The signal D-STAGE-RELEASE is not asserted except for state S0, and the execution of the instruction is inhibited. In the state S1, two signals, i.e., the signal (IMLT-SEQ) indicating the execution of the multiplication instruction, and the signal (MEM-SEQ) indicating the execution of the instruction for the memory/cache, for example, LOAD/STORE instruction, are input to the OR gate. This circuit holds state S1 until these signals indicate completion of the execution, and the state is shifted to state S2 after completion of the execution.

In state S2, the value of the program counter PC is transferred to the interruption save register OPC so as to restart the process of the instruction which is interrupted. In state S3, the address of the destination of the interruption is transferred to the program counter PC, and in state S4, restart of the fetch of the instruction is instructed. The state is shifted to the state S0 after state S4. When the instruction fetch circuit completes the fetch of the instruction, the execution of the interruption program is started.

Further, it is necessary to provide reset ports which are used for the resetting of the scoreboard bit which is set in error. The reset port may be provided independently, or may wait for completion of all instructions which started the execution prior to the interruption before reset operation. Accordingly, since the reset port of the scoreboard is not used after the above process, the selector is provided before stage of the port in order to reset the scoreboard which is set in error. The selector is controlled by the signal SCB-MODIFY which is previously explained. When the signal SCB-MODIFY is set to "1", the signals SCB-SET-ADR-REG and SCB-SET-CANCELED are selected.

The reset of the bits of the scoreboard which are set in error can be executed at any time after state S2. In this example, in state S4, the signal SCB-MODIFY is set to "1" in order to reset the scoreboard bits which are set in error. Further, at the same time, the signal SCB-SET-CANCELED is reset by the signal SCB-MODIFY in order to indicate that there is a scoreboard which is set in error.

Although this example shows the cache block, when a co-processor interface generates an exception at a late timing, it is possible to provide a method of using the register write information in which a co-processor interface holds and of resetting the scoreboard.

FIG. 19 shows a pipeline without an asynchronous execution. The pipeline structure in which the following instruction does not start the execution (i.e., asynchronous execution) during execution of the LOAD instruction is explained using a model R3000 of MIPS. This pipeline always uses the C-stage in the case of the instruction, such as an ADD instruction, which the cache access stage is not necessary.

Figure 12:
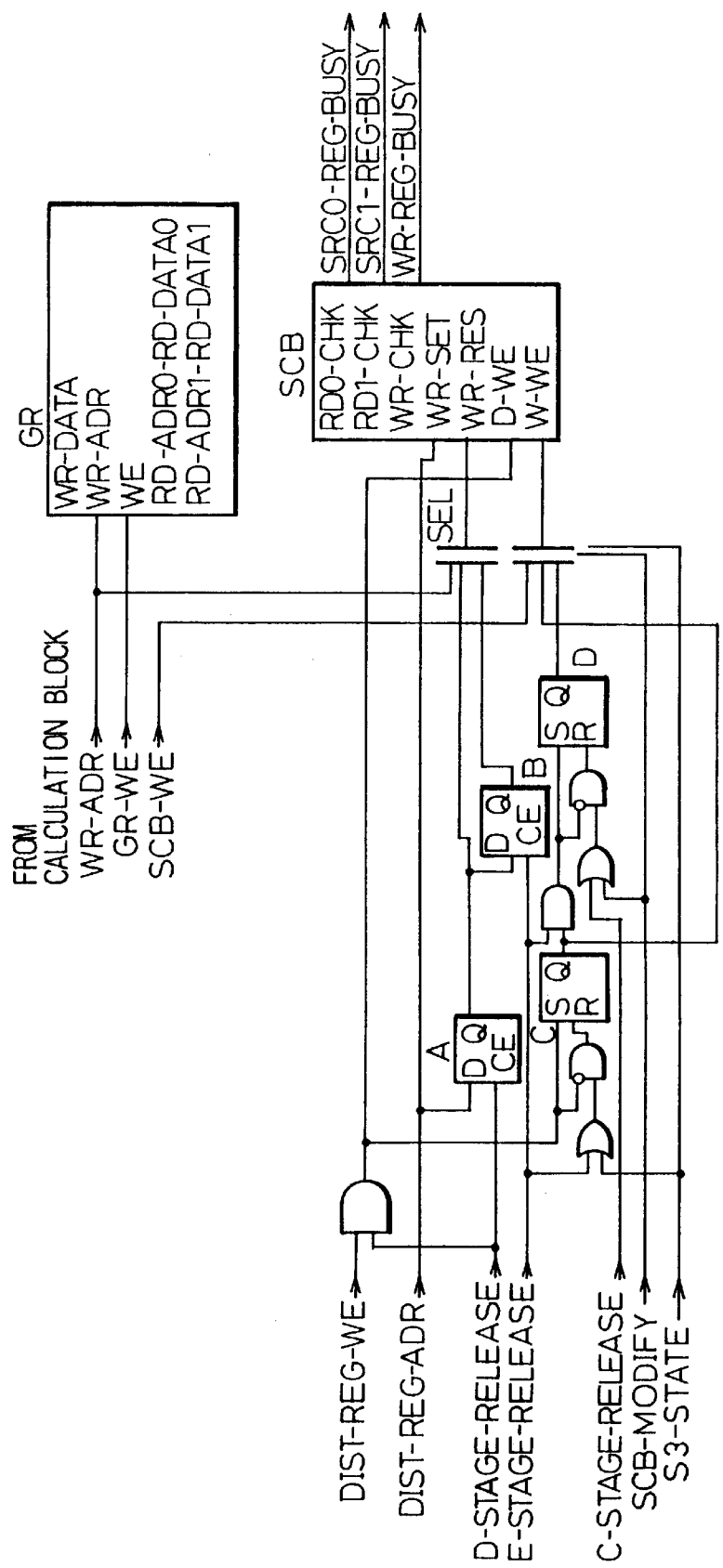
FIG. 12 shows another example of a scoreboard correction circuit according to the present invention.

In the above example, when the first LOAD instruction detects the exception in the C-stage, two scoreboard "bit" are set in error. Accordingly, two sets of the registers are necessary for storing the scoreboard in error. FIG. 12 shows one example of this circuit. A and B denote the register SCB-SET-ADR-REG, and C and D denote the register SCB-SET-CANCELED. The register A stores the location which is finally set in the scoreboard, and the register B stores the location just before the above in the scoreboard.

The register C holds whether the instruction executing the E-stage sets the scoreboard. Accordingly, the register C is set when there is the write operation to the general register, and the register C is reset when the E-stage is completed. Further, when the scoreboard is reset by an interruption (see, the signal S3-STAGE), at the same time, the register C is reset.

The register D holds whether or not the instruction executing the C-stage sets the scoreboard. Accordingly, when the instruction which executes in the E-stage is the instruction which sets the scoreboard, and when the instruction completes the E-stage, the register D is set and reset when the C-stage is completed. Further, when the scoreboard is reset in the interruption (see the signal SCB-MODIFY of FIG. 7), and at the same time, the register C is reset.

To return from the scoreboard having maximum two errors to the original scoreboard, the selection which is provided before the scoreboard has three inputs, selects the registers CB-SEY-ADR-REG (A) and SDB-SET-CANCELED (C), and resets the scoreboard which contradicts because the instruction executing the E-stage sets the scoreboard and this instruction is canceled. Further, the selector selects the registers CB-SEY-ADR-REG (B) and SCB-SET-CANCELED (D) by using the signals SCB-MODIFY to reset the scoreboard which contradicts based on the same reason as above.

Figure 15:
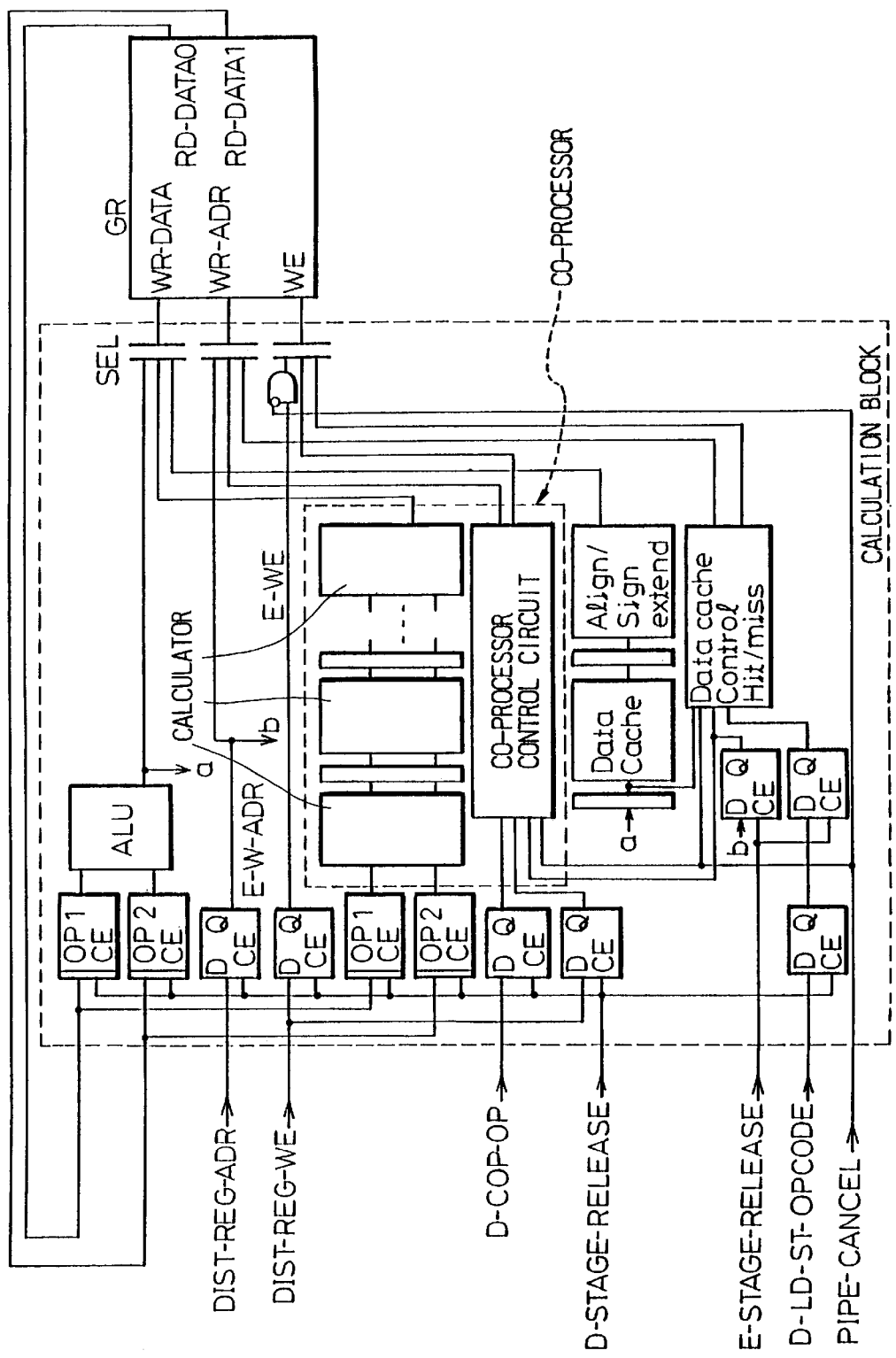
FIG. 15 shows still another example of a calculation block and a register file according to the present invention.

FIG. 15 shows another example of the calculation block and register file. FIG. 15 shows the calculation block and register file substituting the integer multiplication control circuit of FIG. 9 for the co-processor control circuit. In FIG. 15, the data cache block executes the load/store instruction for memory access. The co-processor is physically mounted on a board as a different LSI from the calculation block. The register file reads the source operand, such as calculation, and writes the result of the calculation.

When executing the instruction which calculates in the ALU, the result of the calculation is generated in one calculation stage. In this calculation stage, the selection circuit which is provided before the register file selects the output of the ALU, the result of the ALU is written into the register file in the write stage by using the write register address which is held in the pipeline register (E-W-ADR, E-WE) and the write control signal.

When executing the instruction for the co-processor, the result of the instruction is generated after plural calculation stages. The co-processor which writes data into the register file is controlled by the co-processor control unit after completion of the calculation. The selecting circuit selects the output between the co-processor and the co-processor control circuit, the result of the calculation of the co-processor writes into the register file by using write register address which is held in the co-processor control circuit and the write control signal which is generated by decoding the co-processor instruction.

When a write register address holding circuit is shared with another calculator, and when the co-processor instruction which executes the write to the register operates (or, is entered into a queue of the co-processor instructions), the write register address holding circuit (not shown) is provided independently in the co-processor control unit since the following instruction cannot be executed.

When executing the memory access instruction, and when the cache is mis-hitted in the execution of the load-instruction, it is necessary to perform data transfer from the main storage. Accordingly, the write operation to the register file is controlled after confirmation of a cache hit or completion of data transfer from the main storage. The selecting circuit selects the output of the cache block (lower portion of the drawing), the result of the load instruction is written into the register file in accordance with the write register address and the write control signal which are generated by the cache control circuit.

When the interruption having an inhibit type is detected when the instruction which calculates in the ALU executes in the E-stage, the signal PIPE-CANCEL is asserted and the write operation is inhibited. In this case, since the instruction which executes prior to the interruption is not inhibited, this instruction is not dependent on the signal PIPE-CANCEL.

When the memory access instruction detects an interruption having the inhibit type during execution of the instruction for the memory access, the signal PIPE-CANCEL is asserted and the write by the following instruction is inhibited. Further, the write by the memory access instruction itself is inhibited in the memory access control circuit.

Figure 13:
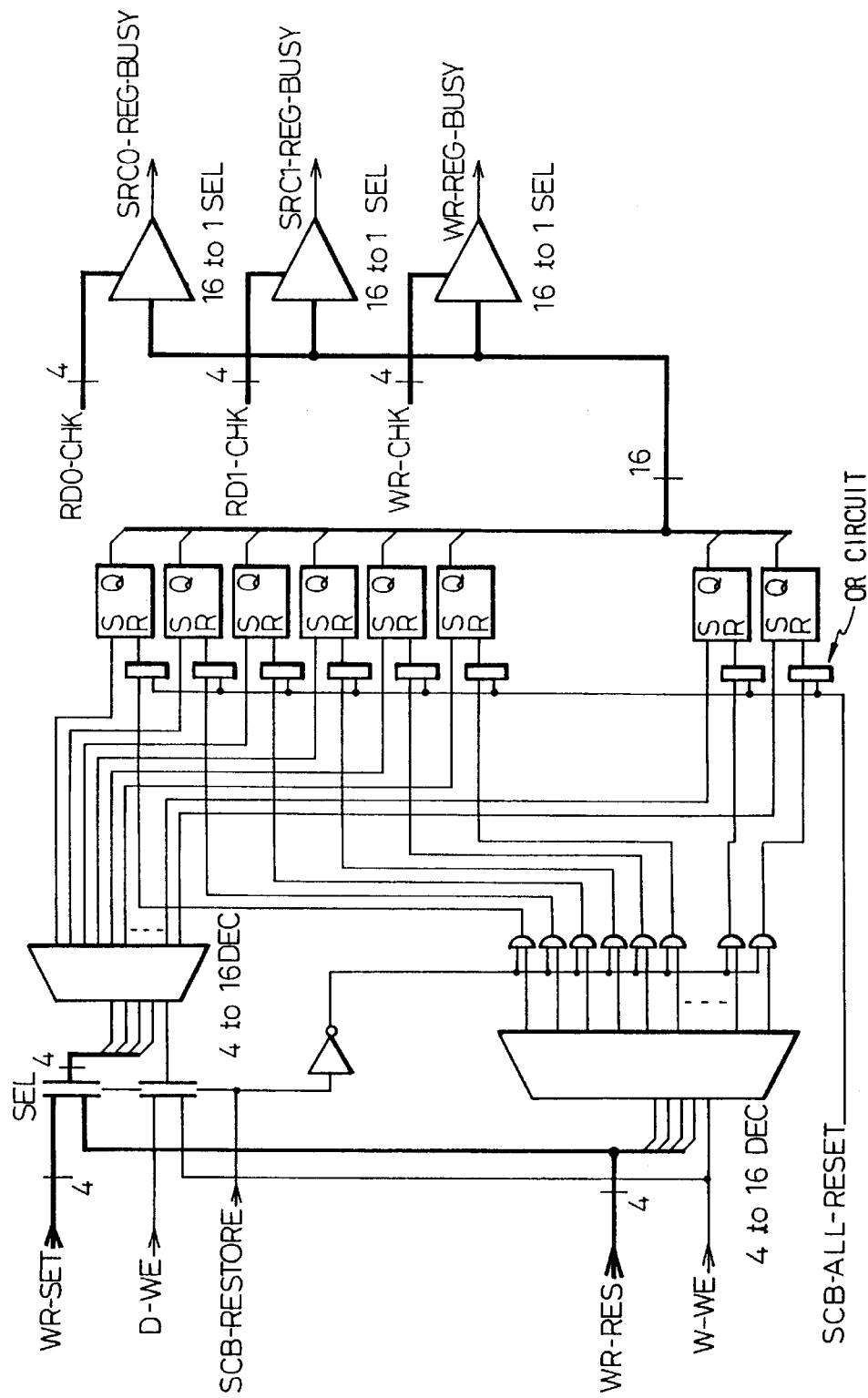
FIG. 13 shows another example of a scoreboard according to the present invention.

FIG. 13 shows a structural view of another example of a scoreboard. In FIG. 13, the read operand register number (SRC-REG-ADR0, SRC-REG-ADR1) and the write operand register number (DIST-REG-ADR) are input to the read/write register detection port (RD0-CHK, RD1-CHK, WR-CHK).

Further, the explanation is given to another example of the operation when the interruption occurs. By resetting all scoreboards when the interruption occurs, the scoreboard which is set in error is reset, and the execution of the next instruction (i.e., interruption program) is started after completion of all instructions except for the co-processor which starts the execution prior to the interruption.

In the scoreboard circuit of FIG. 13, it is possible to reset all bits of the scoreboard. The signal SCE-ALL-RESET is input to the OR circuit, and the output of the OR circuit is input to the scoreboard register. Accordingly, when the signal SLB-ALL-RESET is set to "1", all bits of the scoreboard are reset.

The instruction decoder performs detection of non-definition instruction. The decoder obtains the timing by synchronizing with the register, and detects the cause of the interruption by performing OR operation with the cause of the interruption detected in the E-stage. In this example, since all interruptions inhibit the instruction, the interruption detection signal is used as the inhibition signal PIPE-CANCEL which inhibits the write control signal to the register. In the case of the overflow/underflow state of the calculation, the write to the register is not inhibited since it is a completion type interruption (it is the type having the function for writing the result of the overflow into the register).

As explained above, the detection circuit for non-definition instructions can be structured by OR circuits which perform an OR operation on the code of the non-definition instructions. As one example of the cause of the interruption which is detected in the E-stage, the alignment exception detection circuit for the memory access instruction is shown in FIG. 5.

Figure 14:
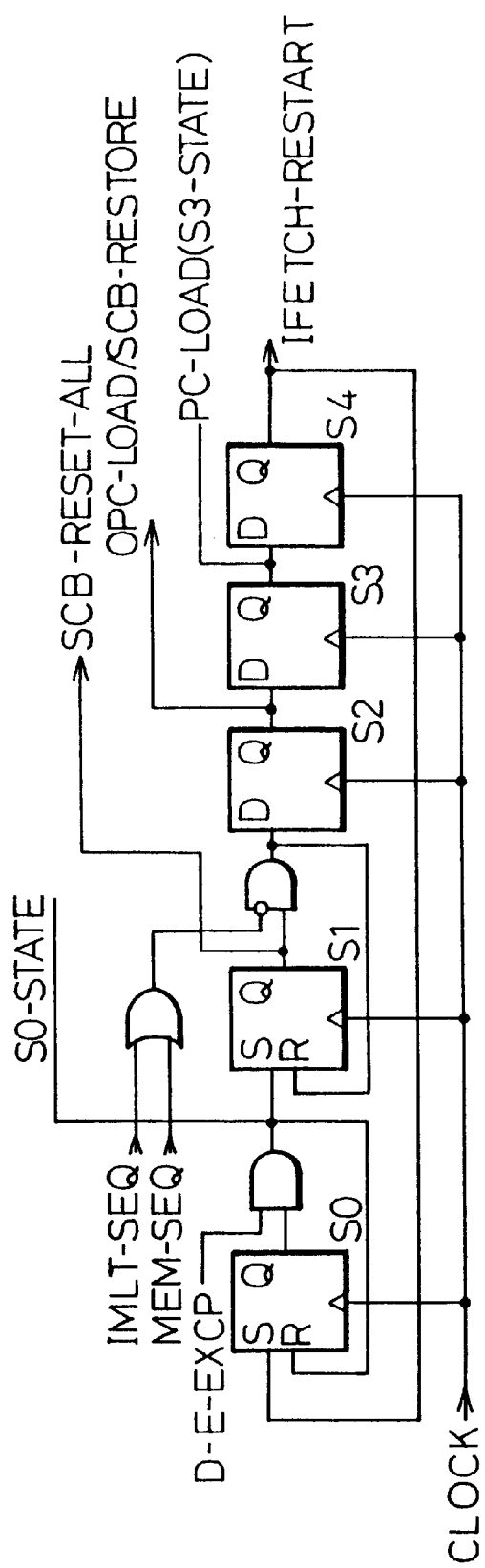
FIG. 14 shows another example of a state transient circuit according to the present invention.

FIG. 14 shows another example of the state transient circuit. This circuit waits for completion of all instructions except for a co-processor instruction which starts executing prior to the interruption. In the initial state, only the register of state S0 is "1", and any other is "0". When the interruption occurs, the signal D-E-EXCP becomes "1", the register changes from state S0 to state S1. As shown in FIG. 5, the signal D-STAGE-RELEASE is not asserted except at state S0, and the execution of the instruction is inhibited.

In state S1, the register receives the signal IMT-SEQ indicating the on execution of the multiplication instruction and the signal MEM-SEQ indicating on execution of the instruction of the memory/cache operation, such as the LOAD/STORE instruction, holds state S1 until these signals indicate completion of the execution, and shifts to state S2 after completion of the execution. In state S1, the signal SCB-ALL-RESET is "1" so that all bits of the scoreboard are reset.

In state S2, the contents of the program counter PC are transferred to the interruption save register OPC so as to restart the instruction which is interrupted. Further, the scoreboard is set by using the write address and the write control signal which are held in the processor control unit. In this embodiment, the same signal lines as the normal write are used for the write address and the write control signal. Further, the selector switches between the signal WR-SET and the write address signal WR-RES and between the signals D-WE and the signal W-WE.

Since the signal SCRB-RESTORE is asserted in state S2, the selector SEL can set itself by using the write address and the write control signal which are sent from the co-processor control unit. At that time, in order not to simultaneously reset these signals, either the set/reset register is structured so as to have "priority to setting" (i.e., priority is given to the setting operation), or the signal inverted from the SCR-RESTORE and the output of the decoder are gated by the AND circuit so as not to assert the output of the decoder (4 to 16) of the reset side.

In state S3, the address of the destination of the interruption is transferred to the program counter PC, and in state S4, the restart of the fetch of the instruction is instructed. The register shifts to state S0 after state S4, and when the instruction fetch circuit completes the fetch of the instruction, the execution of the instruction of the interruption program is started.

It is necessary to perform the resetting of the scoreboard in correspondence to the number of the write register. In this example, although only one write register is provided, when two registers are provided for reserving the write operation, state S3 is used and the register address and the write control signal are transferred in state S3. Further, by using the selector for switching state S3, the resetting of the scoreboard is performed.

We claim:

1. A pipeline computer having scoreboard control functions, said pipeline computer comprising:

data dependency detection means provided in a scoreboard for detecting dependency of data between a preceding instruction and a following instruction, the preceding instruction being an instruction which executes prior to the following instruction;

means for ensuring the dependency of data detected by the data dependency detection means based on an interlock operation of pipeline processes when an interruption occurs;

scoreboard setting storage means for holding information bits on the scoreboard which are set to an in use state;

scoreboard resetting address selection means for inputting a scoreboard setting address signal, a register writing address indicating a write register number to a register file, and a selector selecting signal, and for selecting a resetting address of the scoreboard; and scoreboard resetting enable selecting means for inputting a scoreboard setting invalid signal, a register writing enable signal for controlling the write to the register file, and a selector selecting signal, and for selecting the reset enable signal from the scoreboard, wherein, when an interruption occurs, an interruption instruction is not processed until completion of an instruction which has started to execute prior to the interruption instruction, and the register bits indicating the in use state in the scoreboard which are set in error are reset to a not used state based on a scoreboard setting address signal output from the scoreboard setting storage means and which indicates a location which is set to the in use state, and based on a scoreboard setting invalid signal output from the scoreboard setting storage means and which indicates the scoreboard is set to the in use state in error, and wherein all non-serialized instructions of which execution is started prior to receiving the interruption instruction are completed before execution of an interruption program is started, and when the interruption occurs, the interruption instruction waits for completion of the instruction which has begun to execute prior to the interruption instruction, and the selector selecting signal is asserted after waiting for the completion, and the register bits indicating the in use state of the scoreboard which are set in error are reset based on the scoreboard setting address selected by the selector selecting signal, and based on the scoreboard setting invalid signal.

2. A pipeline computer having scoreboard control functions, said pipeline computer comprising:

data dependency detection means provided in a scoreboard for detecting dependency of data between a preceding instruction and a following instruction, the preceding instruction being an instruction which executes prior to the following instruction;

means for ensuring the dependency of data detected by the data dependency detection means based on an interlock operation of pipeline processes when an interruption occurs; and scoreboard setting storage means for holding information bits on the scoreboard which are set to an in use state;

write register information holding means for holding register information written by a write instruction;

scoreboard reset address selecting means for receiving the scoreboard setting address signal, the register writing address, and the selector selecting signal, and for selecting a reset address of the scoreboard; and scoreboard reset enable selecting means for receiving the scoreboard setting invalid signal, the register write enable for controlling writing to a register file, and the selector selecting signal, and for selecting a reset enable signal of the scoreboard, wherein, when an interruption occurs, an interruption instruction is not processed until completion of an instruction which has started to execute prior to the interruption instruction, and the register bits indicating the in use state in the scoreboard which are set in error are reset to a not used state based on a scoreboard setting address signal output from the scoreboard setting storage means and which indicates a location which is set to the in use state, and based on a scoreboard setting invalid signal output from the scoreboard setting storage means and which indicates the scoreboard is set to the in use state in error, and wherein all non-serialized instructions of which execution is started prior to receiving the interruption instruction are completed before execution of an interruption program is started, when the interruption occurs in the write register holding means after loss of bit information of the scoreboard in which the scoreboard set storage means sets a bit to the in use state, the scoreboard is reset to the not used state by using the write register information of the write register information holding means, and when the interruption occurs, the interruption instruction waits for completion of the instruction which has begun to execute prior to the interruption instruction, and the selector selecting signal is asserted after waiting for the completion, the register bits indicating the in use state in the scoreboard which are set in error are reset based on a scoreboard set address selected by the selector selecting signal, and on a scoreboard set invalid signal.

* * * * *

UNITED STATES PATENT AND TRADEMARK OFFICE
CERTIFICATE OF CORRECTION

PATENT NO. : 6,055,625
DATED : April 25, 2000
INVENTOR(S) : Tatsumi NAKADA et al.

It is certified that error appears in the above-identified patent and that said Letters Patent is hereby corrected as shown below:

On th title page, item [63] Related U.S. Application Data, third line, change "1991"

Signed and Sealed this

Twenty-seventh Day of February, 2001

Attest:

NICHOLAS P. GODICI

Attesting Officer

Acting Director of the United States Patent and Trademark Office